United States Patent
Kawakami

(10) Patent No.: US 10,730,350 B2
(45) Date of Patent: Aug. 4, 2020

(54) PNEUMATIC TIRE

(71) Applicant: BRIDGESTONE CORPORATION, Chuo-ku, Tokyo (JP)

(72) Inventor: Yuki Kawakami, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 304 days.

(21) Appl. No.: 14/773,831

(22) PCT Filed: Mar. 13, 2014

(86) PCT No.: PCT/JP2014/057634
§ 371 (c)(1),
(2) Date: Sep. 9, 2015

(87) PCT Pub. No.: WO2014/142348
PCT Pub. Date: Sep. 18, 2014

(65) Prior Publication Data
US 2016/0016438 A1    Jan. 21, 2016

(30) Foreign Application Priority Data
Mar. 13, 2013   (JP) .................................. 2013-050297

(51) Int. Cl.
     *B60C 11/13*      (2006.01)
     *B60C 11/03*      (2006.01)
     *B60C 11/12*      (2006.01)

(52) U.S. Cl.
CPC ...... B60C 11/0327 (2013.01); B60C 11/0306 (2013.01); B60C 11/1218 (2013.01);
(Continued)

(58) Field of Classification Search
CPC ............. B60C 11/1218; B60C 11/1281; B60C 11/1204; B60C 11/1376; B60C 11/1392; B60C 11/1263
See application file for complete search history.

(56) References Cited

U.S. PATENT DOCUMENTS 3,998,256 A    12/1976   Verdier
5,593,521 A *   1/1997   Iseki .................. B60C 9/20
                                                   152/209.28
(Continued)

FOREIGN PATENT DOCUMENTS

CN      103796845 A      5/2014
EP      0847878 A2      6/1998
(Continued)

OTHER PUBLICATIONS

English machine translation of JP2007-191093, dated Aug. 2007.*
(Continued)

*Primary Examiner* — Robert C Dye
(74) *Attorney, Agent, or Firm* — Kenja IP Law PC

(57) ABSTRACT

Provided is a pneumatic tire being improved in heat dissipation effect in the tread portion while being ensured in rigidity of the land portion. A narrow groove (10) is formed on a tread surface (1), the narrow groove extending in a direction inclined with respect to the tire circumferential direction and having a groove width (W1) and a groove depth (D1), the groove width (W1) being smaller than the groove depth (D1). The narrow groove (10) terminates at least one end thereof within the land portion. An air inflow part (11) is formed on at least one of the groove walls (10c) of the narrow groove (10), the groove walls facing each other in the tire circumferential direction, where the narrow groove (10) has a maximum depth (D1) and the air inflow part (11) has a maximum depth (D2), the D1 and the D2 satisfying $1 \leq D1/D2 \leq 15$.

11 Claims, 9 Drawing Sheets

(52) U.S. Cl.
CPC ...... *B60C 11/1281* (2013.01); *B60C 11/1307* (2013.01); *B60C 11/1392* (2013.01); *B60C 2011/0381* (2013.01); *B60C 2011/0383* (2013.01); *B60C 2011/133* (2013.01); *B60C 2200/14* (2013.01)

(56) References Cited

U.S. PATENT DOCUMENTS

| | | | | |
|---|---|---|---|---|
| 2008/0041509 | A1* | 2/2008 | Shimizu | B60C 11/0311 152/209.16 |
| 2010/0084062 | A1* | 4/2010 | Miyazaki | B60C 11/1281 152/209.18 |
| 2010/0212792 | A1 | 8/2010 | Mita | |
| 2011/0005649 | A1* | 1/2011 | Aoki | B60C 11/0306 152/209.1 |
| 2011/0005651 | A1* | 1/2011 | Mori | B60C 11/0316 152/209.18 |
| 2011/0005652 | A1* | 1/2011 | Ono | B60C 11/0309 152/209.18 |
| 2011/0017375 | A1* | 1/2011 | Aoki | B60C 11/0316 152/209.24 |
| 2012/0118461 | A1* | 5/2012 | Matsuzawa | B60C 11/0311 152/209.18 |

FOREIGN PATENT DOCUMENTS

| | | |
|---|---|---|
| EP | 1580032 A1 | 9/2005 |
| EP | 2208622 A1 | 7/2010 |
| EP | 2457745 A1 | 5/2012 |
| EP | 2636544 A1 | 9/2013 |
| EP | 2754567 A1 | 7/2014 |
| JP | H05-096913 A | 4/1993 |
| JP | H07-052613 A | 2/1995 |
| JP | 2000-264022 A | 9/2000 |
| JP | 2003-205706 A | 7/2003 |
| JP | 2007-191093 A | 8/2007 |
| JP | 2007-230399 A | 9/2007 |
| JP | 2009-227264 A | 10/2009 |
| JP | 2012-001154 A | 1/2012 |
| WO | 2011/098406 A1 | 8/2011 |
| WO | 2013/035889 A1 | 3/2013 |

OTHER PUBLICATIONS

English machine translation of JP2007-230399. (Year: 2007).*
Jun. 3, 2014 International Search Report issued in International Patent Application No. PCT/JP2014/057634.
Feb. 25, 2014, Notification of Reasons for Refusal issued by the Japan Patent Office in the corresponding Japanese Patent Application No. 2013-050297.
Jun. 3, 2014, Notification of Reasons for Refusal issued by the Japan Patent Office in the corresponding Japanese Patent Application No. 2013-050297.
Feb. 24, 2015, Official Decision of Refusal issued by the Japan Patent Office in the corresponding Japanese Patent Application No. 2013-050297.
Dec. 15, 2017, Search Report issued by the National Institute for Industrial Property of Chile in the corresponding Chilean Patent Application No. 2015-002618.
Mar. 8, 2018, Search Result of Office Action issued by the National Institute for Industrial Property of Chile in the corresponding Chilean Patent Application No. 2015-002618.

* cited by examiner

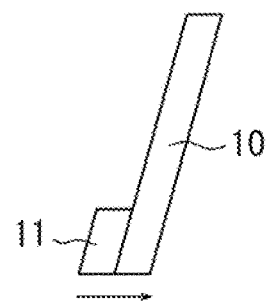
FIG. 6A
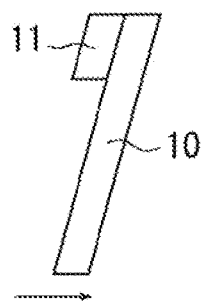
FIG. 6B
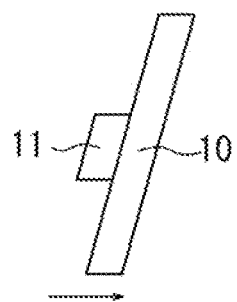
FIG. 6C
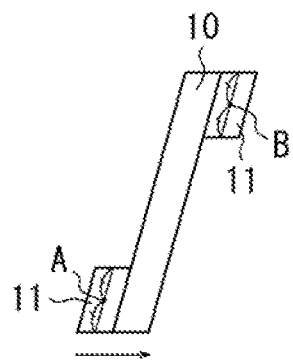
FIG. 7A
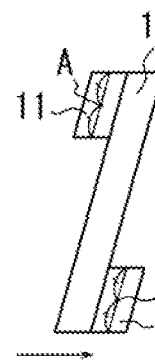
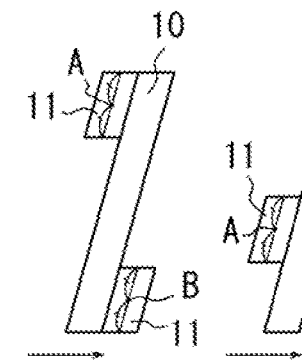
FIG. 7C
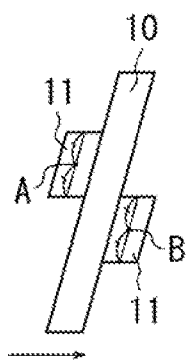
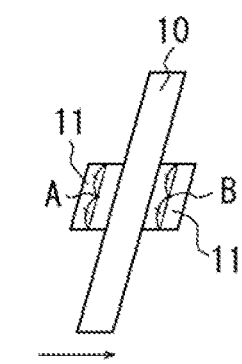
FIG. 7E
FIG. 7B
FIG. 7D

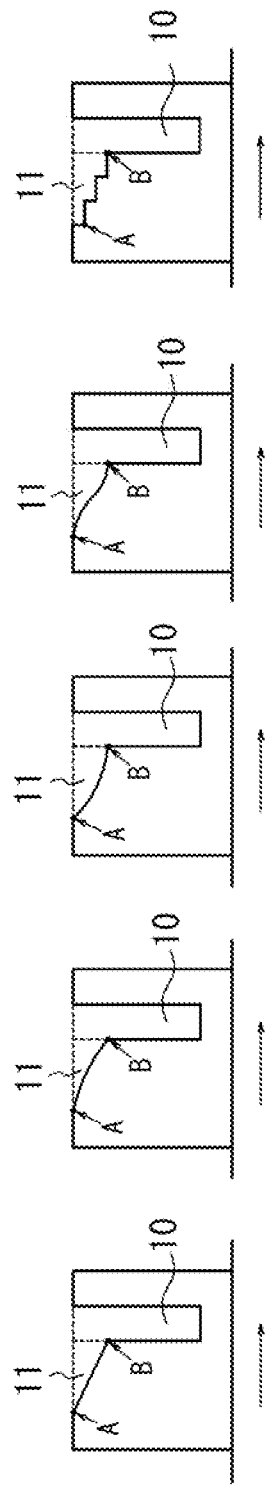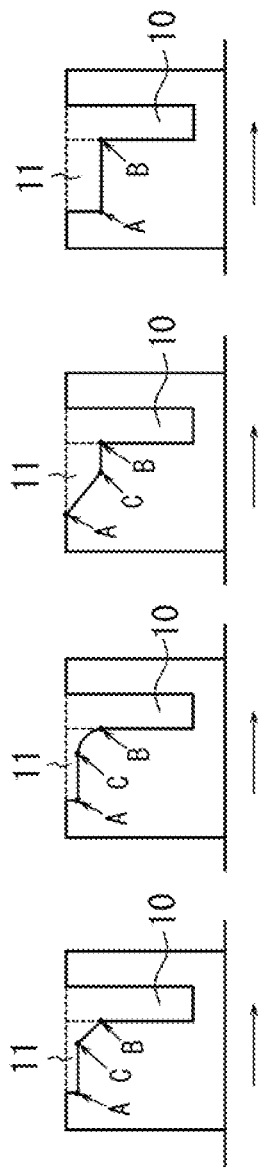

PNEUMATIC TIRE

TECHNICAL FIELD

This disclosure relates to a pneumatic tire improved in heat dissipation effect in a tread portion.

BACKGROUND

The tread portion generates heat during rotation of the tire with a load applied thereon and is subjected to high temperature, which leads to various failures such as heat separation. Therefore, in order to lower the temperature of the tread portion, it is necessary to reduce the heat generation or to promote heat dissipation.

Conventionally, in order to lower the temperature of the tread portion, there has been employed a method of forming grooves in the tread portion so as to remove tread rubber that serves as a heat source while increasing a surface area of the tread portion such that the heat dissipation is enhanced (see, for example, Patent Literature 1).

Further, in order to enhance heat dissipation effect in the tread portion, there has also been known a technology in which, with respect to a narrow groove extending in the tire width direction, small grooves extending in a direction intersecting the longitudinal direction of the narrow groove are provided, so as to disturb the flow of air within the narrow grooves (see, for example, Patent Literature 2).

CITATION LIST

Patent Literature

PTL 1: JP 2003-205706 A
PTL 2: JP 2007-230399 A

SUMMARY

Technical Problem

However, in a groove that is small in width and extends in the tire width direction is unlikely to generate airflow within the groove. Further, it is necessary to further increase the number of grooves in order to improve the effect of lowering the temperature. Such an increase in the number of grooves, however, leads to a reduction in rigidity of a land portion, causing deterioration of antiwear performance and steering stability.

Therefore, it could be helpful to provide a pneumatic tire improved in heat dissipation effect of the tread portion while ensuring rigidity of the land portion.

Solution to Problem

It could therefore be helpful to provide a pneumatic tire including a narrow groove formed on a tread surface, the narrow groove extending in a direction inclined with respect to the tire circumferential direction and having a groove width smaller than the groove depth, the narrow groove terminating, at least one end thereof, within the land portion, an air inflow part opening to the tread surface being formed at least one of the groove walls of the narrow groove, the groove walls facing each other in the tire circumferential direction, the pneumatic tire having a feature in that the narrow groove has a maximum width D1 and the air inflow part has a maximum depth D2, the D1 and the D2 satisfying: $1 \leq D1/D2 \leq 15$.

Advantageous Effect

It is possible to provide a pneumatic tire improved in heat dissipation effect in the tread portion while ensuring rigidity of the land portion.

BRIEF DESCRIPTION OF THE DRAWINGS

In the accompanying drawings:

FIG. 6 each are an illustration of a modified example of the inflow part;

FIG. 7 each are an illustration of a modified example of the inflow part;

FIG. 9 each are an illustration of a modified example of the inflow part; and

DETAILED DESCRIPTION

In the following, an embodiment of the disclosed pneumatic tire is illustrated by way of an example, with reference to the accompanying drawings.

Figure 1A:
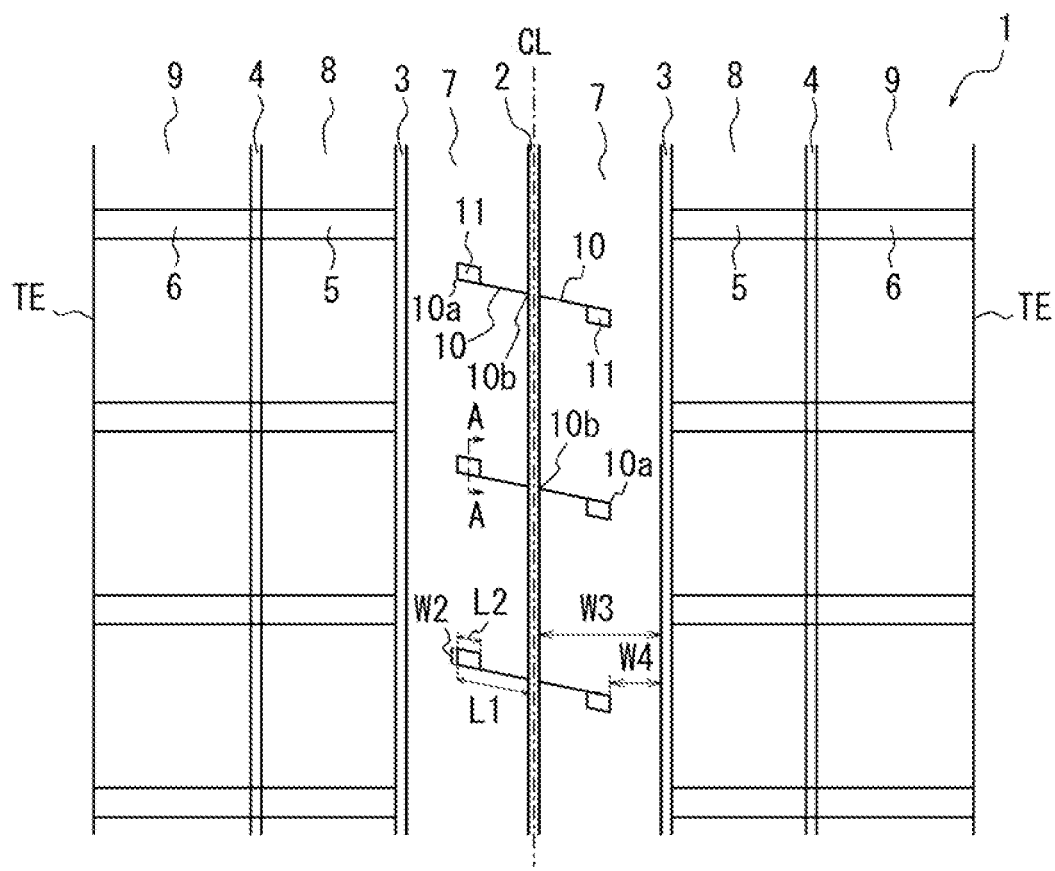
FIG. 1(a) is a developed view of a tread pattern of the disclosed pneumatic tire according to an embodiment thereof.

FIG. 1(a) is a developed view of a tread pattern of the disclosed pneumatic tire according to an embodiment thereof. A tread surface 1 of the pneumatic tire includes: a central circumferential groove 2 extending along the tire circumferential direction on a tire equatorial plane CL; a pair of intermediate circumferential grooves 3 extending along the tire circumferential direction across the central circumferential groove 2; a pair of lateral circumferential grooves 4 extending along the tire circumferential direction, on the tire width direction outside of the intermediate circumferential grooves 3; an intermediate widthwise groove 5 extending along the tire width direction while communicating with the intermediate circumferential grooves 3 and with the lateral circumferential grooves 4; and a lateral widthwise groove 6 extending along the tire width direction while communicating with the lateral circumferential grooves 4 and extending toward a tread surface end TE.

The central circumferential groove 2 and the intermediate circumferential grooves 3 together define a pair of rib-shaped central land portions 7 across the tire equatorial plane CL. The intermediate circumferential grooves 3, the lateral circumferential grooves 4, and the intermediate widthwise grooves 5 together define block-shaped intermediate land portions 8. The lateral circumferential grooves 4 and the lateral widthwise grooves 6 together define block-shaped lateral land portions 9. Here, the tread pattern is illustrated in the drawing by way of example, and the present disclosure may be applicable to a rib-based pattern and a block-based pattern, or any other arbitrary patterns. The intermediate widthwise groove 5 and the lateral widthwise groove 6 may be inclined with respect to the tire width direction, and may have a non-constant width. The lateral widthwise groove 6 does not need to be communicating with the tread surface end TE.

Figure 1B:
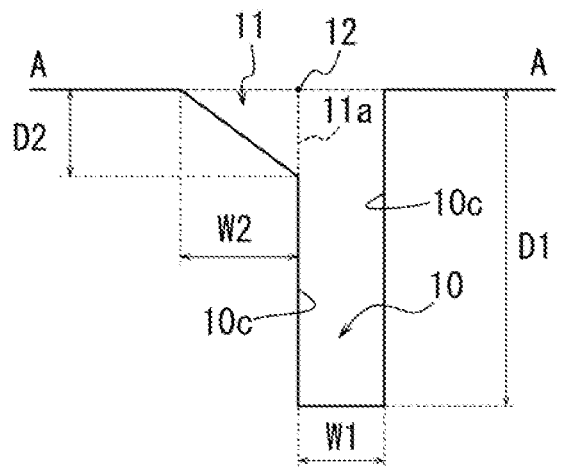
FIG. 1(b) is a sectional view taken along the line A-A of FIG. 1(a)

In the rib-shaped central land portions 7, narrow grooves 10 are formed extending in a direction inclined with respect to the tire circumferential direction. The narrow grooves 10 each terminate at one end 10a within the rib-shaped central land portions 7 while opening at the other end 10b to the central circumferential groove 2. As illustrated in FIG. 1(b), the narrow grooves 10 each have a groove width W1 that is smaller (narrower) than a groove depth D1 in the A-A section. In the illustrated example, the groove width W1 is in the tire circumferential direction.

Further, the narrow grooves 10 each have an air inflow part 11 opening to the tread surface 1, the air inflow part 11 being formed on one of groove walls 10c facing each other in the tire circumferential direction. The narrow grooves 10 each have a maximum depth D1 and the air inflow part 11 has a maximum depth D2, where the D1 and the D2 satisfy the following condition: $1 \leq D1/D2 \leq 15$. The air inflow part 11 is formed by cutting out a corner 12 defined by the tread surface 1 and the groove wall 10c, at least in part in the longitudinal direction of the narrow groove 10.

It should be noted that the arrangement of the narrow grooves 10 is illustrated in the drawing by way of example, and the narrow grooves 10 disclosed herein may be formed, other than in the rib-shaped central land portions 7, in the block-shaped intermediate land portions 8 or in the block-shaped lateral land portions 9. Further, the narrow groove 10 may be inclined at an arbitrary angle θ (0<θ≤90°) relative to the tire circumferential direction, and the plurality of tire grooves 10 may not be formed as being parallel to one another. In the illustrated example, the narrow grooves 10 are each terminated at one end 10a thereof within the rib-shaped central land portions 7 and open to the central circumferential groove 2 at the other end 10b thereof. However, the narrow groove may only be terminated at least one end in the longitudinal direction thereof within the land portion; it is preferred, in terms of ensuring rigidity of the land portion, that the narrow groove be terminated at both ends in the longitudinal direction thereof within the land portion.

Further, the position and the shape of the air inflow part 11 are illustrated by way of example, and the disclosed air inflow part 11 may be disposed at an arbitrary position in an arbitrary shape relative to the groove wall 10c of the narrow groove 10 as long as being formed on at least one of the groove walls 10c facing each other in the tire circumferential direction. The air inflow part 11 may be formed in a parallelogram in plane shape in the tread surface developed view on the tread, with a pair of opposite sides being parallel to the groove wall 10c of the narrow groove 10 while the other pair of opposite sides being parallel to the tire circumferential direction. In addition thereto, the air inflow part 11 may also be formed in another parallelogram with a pair of opposite sides being parallel to the groove wall 10c of the narrow groove 10 while the other pair of opposite sides being inclined relative to the tire circumferential direction. The air inflow part 11 may be trapezoidal, semicircular, triangular, or the like in plane shape when viewed from the tread surface.

An operation of the disclosed pneumatic tire is described in below.

When the tire rotates, wind (air) flows around the tire in a direction opposite to the rotation direction of the tire. The wind may be taken into the grooves formed on the tread surface 1, to thereby dissipate heat from the tread portion, which lowers the temperature of the tread portion. When the grooves formed on the tread surface 1 are large in width, wind can be taken into the grooves but the land portion is reduced in rigidity, leading to deterioration of antiwear performance and steering stability. On the other hand, when the grooves formed on the tread surface 1 are small enough only not to affect rigidity of the land portion, the grooves cannot take wind thereinto. That is, most of the wind is not taken into the narrow groove 10, with only a part of the wind being taken into the narrow groove 10. However, even the wind that has been taken into the narrow groove 10 only passes through a shallow portion of the narrow groove 10 and is expelled from the narrow groove 10 without reaching the groove bottom of the narrow groove 10, which thus produces only a small effect of lowering the temperature of the tread portion.

In light thereof, the air inflow part 11 is formed on the windward-side groove wall 10c of the narrow groove 10, that is, the tire is mounted onto a vehicle for use such that the groove wall 10c formed with the air inflow part 11 is disposed on the windward side, to thereby take most of the wind into the narrow groove 10 and allow the wind thus taken to reach close to the groove bottom. Meanwhile, the wind that has been taken into the narrow groove 10 flows out from the leeward-side edge. Further, the narrow groove 10 is terminated at one end 10a within the rib-shaped central land portions 7, which can maintain high rigidity in the land portion, as compared with an exemplary case where the narrow groove is opened at both ends thereof to the central circumferential groove 2 (and to the intermediate circumferential groove 3).

Then, the narrow groove 10 and the air flow part 11 may be formed such that the maximum depth D1 of the narrow groove 10 and the maximum depth D2 of the air inflow part 11 satisfy: $1 \leq D1/D2 \leq 15$, to thereby improve the heat dissipation effect in the tread portion, while ensuring an appropriate rigidity in the land portion. In particular, the disclosed pneumatic tire produces a prominent effect when applied to a large tire for use in trucks, buses, and construction vehicles, which are otherwise susceptible to the problem of heat generation in the tread portion along with the increase in size. Further, the disclosed pneumatic tire produces a further prominent effect when applied to a pneumatic tire for construction vehicles, because the tire is exposed on the vehicle side (opposite side to the contact surface that is in contact with the road surface) without being covered by the vehicle. It should be noted that when the aforementioned D1/D2 is less than 1, the volume of the land portion is excessively reduced, which leads to a fear that the land portion may have insufficient rigidity; while when the D1/D2 exceeds 15, the effect of taking into wind is reduced, which leads to a fear that the effect of dissipating heat becomes insufficient. Further, in terms of ensuring sufficient rigidity of the land portion and heat dissipation effect, it is more preferred that the D1 and the D2 satisfy the following relation: 5≤D1/D2≤10.

The depth of the air inflow part 11 may preferably become maximum at the groove wall opening edge 11a that opens to the groove wall 10c of the narrow groove 10. This configuration makes the opening larger, allowing air to readily flow into the narrow groove 10. The air inflow part 11 may preferably have a side profile in section perpendicular to the longitudinal direction of the narrow groove where the air inflow part 11 gradually increases in depth from one end of the narrow groove 10 farther from the groove wall opening edge 11a of the narrow groove 10 toward the groove wall opening edge 11a that opens to the groove wall 10c of the narrow groove 10. This configuration can increase the wind inflow effect, and also suppress wasteful reduction of the volume of the land portion, which prevents reduction of rigidity in the land portion. Here, the bottom face of the air inflow part 11 may be planar or curved. The depth of the air inflow part 11 may increase stepwise toward the groove wall opening edge 11a, or the depth of the air inflow part 11 may be constant.

When the tire has a directional pattern in which the air inflow part 11 is formed in only one of the groove walls 10c of the narrow groove 10 and all the narrow grooves 10 have the air inflow parts 11 disposed on the same direction side in the tire circumferential direction, the pneumatic tire may preferably be mounted onto a vehicle such that the air inflow part 11 is disposed on the windward side. However, in terms of convenience, the air inflow parts 11 may preferably be formed on both of the groove walls 10c facing each other of the narrow groove 10, that is, the groove walls 10c on both sides. Further, even in a case where the air inflow part 11 is only formed on either one, but not both, of the groove walls 10c, the narrow groove 10 having the air inflow part 11 formed on the leeward-side groove wall 10c and the narrow groove 10 having the air inflow part 11 formed on the windward-side groove wall 10c may respectively be formed so as to have a non-directional pattern. When the air inflow parts 11 are formed on the groove walls 10c on both sides of the narrow groove 10, a wind flow is formed such that air flows into the narrow groove 10 from the air inflow part 11 formed on the windward-side groove wall 10c and passes through within the narrow groove 10, so as to flow out from the end of the leeward-side groove wall 10c.

In the case where the air inflow parts 11 are respectively formed on both of the groove walls 10c of the narrow groove 10, a center of one of the air inflow parts 11 along the longitudinal direction of the narrow groove 10 at the groove wall opening edge 11a opening to the groove wall, the air inflow part 11 being formed on one of the groove walls of the narrow groove 10, may preferably be spaced apart in the longitudinal direction of the narrow groove 10 from a center of the other one of the air inflow parts 11 along the longitudinal direction of the narrow groove 10 at the groove wall opening edge 11a, the air inflow part 11 being formed on the other one of the groove walls of the narrow groove 10, so that the inflow parts 11 do not coincide with one another in position in the tire circumferential direction. With this configuration, air that has flowed in from the air inflow part 11 on the windward side hits the groove wall 10c on the leeward side and is dispersed, which allows air to more reliably flow into the narrow groove 10, to thereby further ensure improvement in heat dissipation effect.

The narrow groove 10 may possibly be formed in an arbitrary position on the rib-shaped central land portions 7. However, in terms of ensuring rigidity of the land portion and heat dissipation effect, a distance W4 in the tire width direction from the intermediate circumferential groove 3 to the narrow groove 10 may preferably fall within a range of 5% to 40% with respect to a width W3 in the tire width direction of the rib-shaped central land portions 7. Further, in terms of improving the heat dissipation effect by means of the air inflow part 11, it is preferred that the narrow groove 10 should desirably be inclined at an angle of 45° or more and 90° or less in the tire circumferential direction.

In the narrow groove 10, the groove width W1 is set to be smaller than the groove depth D1 for the following reason: that is, the narrow groove 10 having a larger depth and a smaller width can make it more easy to take air thereinto, which makes the disclosed effect more prominent. Wind may be taken into the groove with more ease along with an increase of the groove width W1, which however makes it difficult to ensure rigidity of the land portion.

The air inflow part 11, even if being satisfactorily small in size relative to the size of the land portion, can still increase greatly the amount of air entering the narrow groove 10. Thus, the air inflow part 11 may be formed in a size enough to serve the purpose, without significantly reducing the volume of the land portion. Therefore, the air inflow part 11 may be formed with negligibly small impact on the antiwear performance and steering stability.

Meanwhile, if the air inflow part 11 is formed having a length extending throughout the longitudinal direction of the narrow groove 10, a uniform amount of air is inadvertently taken into the entire narrow groove 10 across the longitudinal direction thereof. The air thus taken into the narrow groove 10 is less likely to flow therewithin and may possibly be hindered from flowing out from the narrow groove 10. This problem becomes conspicuous when the narrow groove 10 terminates at both ends thereof within the land portion without opening to the grooves. Therefore, the air inflow part 11 may preferably formed in a portion of the narrow groove 10 in the longitudinal direction. Specifically, the air inflow part 11 may preferably have a length L2 (length along the longitudinal direction of the narrow groove 10) of 5 mm or more and ½ or less of a length L1 of the narrow groove 10 along the longitudinal direction.

Further, the air inflow part 11 becomes smaller along with the wear of the tread portion, with the result that the effect of taking wind or the heat dissipation performance is reduced. However, the amount of heat to be generated in the tread portion also reduces along the wear of the tread portion, and thus, there is little need to design the air inflow part 11 of a brand new tire to be particularly large enough to withstand the wear.

In the following, the flow of wind (air) within the narrow groove is described in further detail with reference to FIGS. 2(a) to 2(e).

Figure 2A:
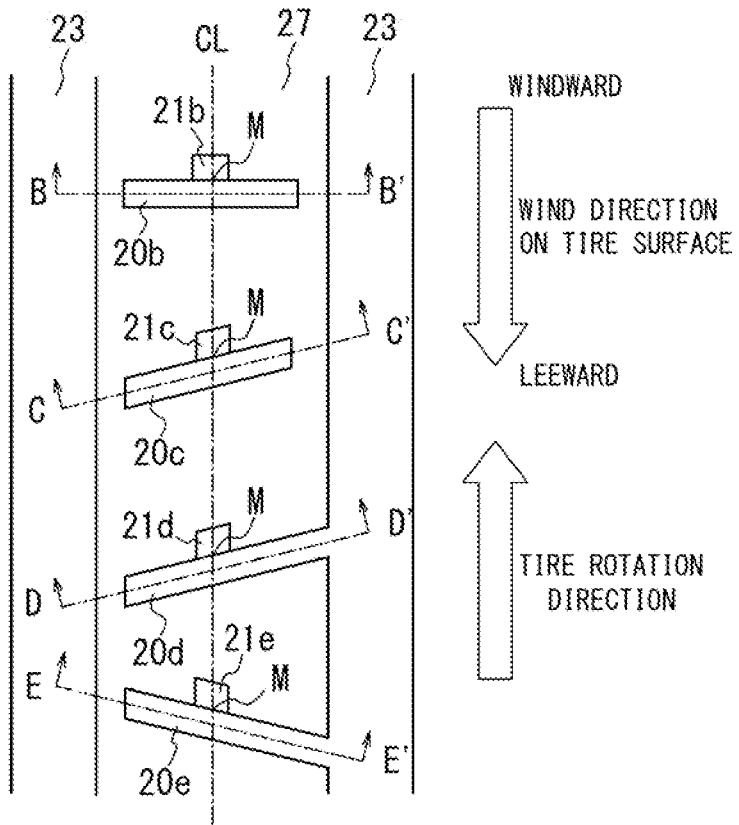
FIG. 2(a) is an exemplary illustration of narrow grooves and an air inflow part formed in the land portion according to a reference embodiment.
Figure 2B:
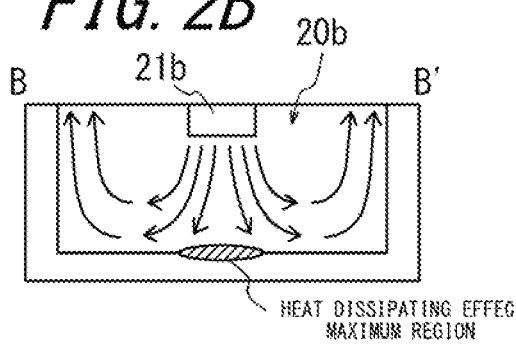
FIG. 2(b) is a sectional view taken along the line B-B' of FIG. 2(a)
Figure 2C:
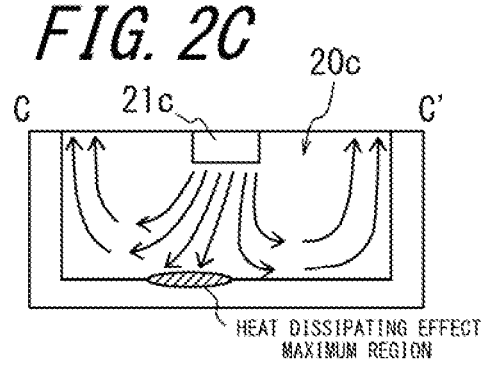
FIG. 2(c) is a sectional view taken along the line C-C' of FIG. 2(a)
Figure 2D:
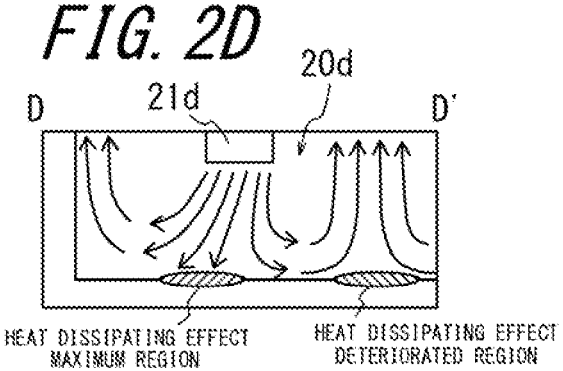
FIG. 2(d) is a sectional view taken along the line D-D' of FIG. 2(a)
Figure 2E:
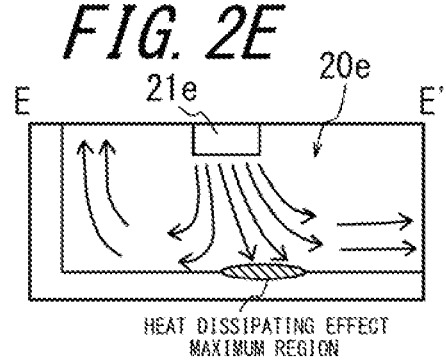
FIG. 2(e) is a sectional view taken along the line E-E' of FIG. 2(a)

FIG. 2(a) illustrates, as a modified example of the narrow grooves and the air inflow part disclosed herein, narrow grooves 20b to 20e and air inflow parts 21b to 21e, arranged on a rib-shaped land portion 27 formed on the tread surface. FIG. 2(b) is a sectional view taken along the line B-B' of FIG. 2(a); FIG. 2(c) is a sectional view taken along the line C-C' of FIG. 2(a); FIG. 2(d) is a sectional view taken along the line D-D' of FIG. 2(a); and FIG. 2(e) is a sectional view taken along the line E-E' of FIG. 2(a). The rib-shaped land portion 27 is disposed in between circumferential grooves 23 extending along the tire circumferential direction, where the rib-shaped land portion 27 has a widthwise center line that coincides with the tire equatorial plane CL. Further, the air inflow parts 21b to 21e are formed such that the centers M along the longitudinal direction of the narrow grooves 20b to 20e (at the groove wall opening edge 11a opening to the groove wall) are positioned on the widthwise center line of the rib-shaped land portion 27. FIGS. 2(b) to 2(e) each schematically illustrate by arrows the flow of air within the narrow grooves 20b to 20e.

In FIG. 2(a), the narrow groove 20b extends along the tire width direction, and the narrow grooves 20c, 20d, 20e are inclined with respect to the tire width direction. Further, the narrow grooves 20b, 20c each terminate at both ends within the rib-shaped land portion 27. As illustrated therein, the narrow groove 20d opens at one end on the windward side to the circumferential groove 23 while the narrow groove 20e opens at one end on the leeward side to the circumferential groove 23, and each terminates at the other end thereof within the rib-shaped land portion 27.

Referring to FIG. 2(b), air having flowed into the narrow groove 20b from the air inflow part 21b flows straight toward the groove bottom as indicated by the arrows, and thus the heat dissipation effect becomes maximum in a region immediately below the air inflow part 21b. In such case, the air inflow part 21b may preferably be formed in a tire widthwise position of a portion to be cooled.

Referring to FIG. 2(c), air having flowed into the narrow groove 20c from the air inflow part 21c flows as being drawn to the leeward side toward the groove bottom as illustrated therein, and thus the heat dissipation effect becomes maximum in a region to the leeward side relative to the position immediately below the air inflow part 21b. In such case, the air inflow part 21c may preferably be formed on the windward side relative to the tire widthwise position of a portion to be cooled.

In the narrow groove 20d of FIG. 2(d), the heat dissipation effect becomes maximum in a region to the leeward side relative to the position immediately below the air inflow part 21d, as in the case of the narrow groove 20c of FIG. 2(c). However, air having flowed thereinto from the air inflow part 21d and air having flowed thereinto from the circumferential groove 23 meet with each other to stagnate, which forms a heat dissipation effect deteriorated region where the heat dissipation effect can hardly be obtained. In such case, the air inflow part 21d may preferably be formed on the windward side relative to the tire widthwise position of a portion to be cooled. In order to suppress the formation of the heat dissipation effect deteriorated region, the air inflow part 21d may preferably be disposed all the way to the windward side (i.e., opening side) as far as possible. Further, when forming the air inflow part 21d, it may be preferred to suppress airflow from the circumferential groove 23; for example, the circumferential groove 23 itself may preferably be reduced in width, an opening may preferably be disposed on the leeward side, or the narrow groove may preferably be prevented from communicating with the tread surface edge.

In the narrow groove 20e of FIG. 2(e), the heat dissipation effect becomes maximum in a region to the leeward side relative to the position immediately below the air inflow part 21e, as in the case of the narrow groove 20d of FIG. 2(d). However, the narrow groove 21e opens on the leeward side, for which air is less likely to flow into from the circumferential groove 23, with the result that the heat dissipation effect deteriorate region shown in FIG. 2(d) is not formed. In such case, the air inflow part 21e may preferably be formed on the windward side relative to the tire widthwise position of a portion to be cooled.

The air inflow part may desirably be arranged relative to the narrow groove, in consideration of the aforementioned air flows within the narrow groove, so that a region where the heat dissipation effect becomes maximum may be formed at a position which requires heat release. Even in a case where the position and the shape of the narrow groove and the air inflow part are different from those of FIG. 2, the most effective position to dispose the air inflow part may still be estimated based on the aforementioned consideration.

Figure 3:
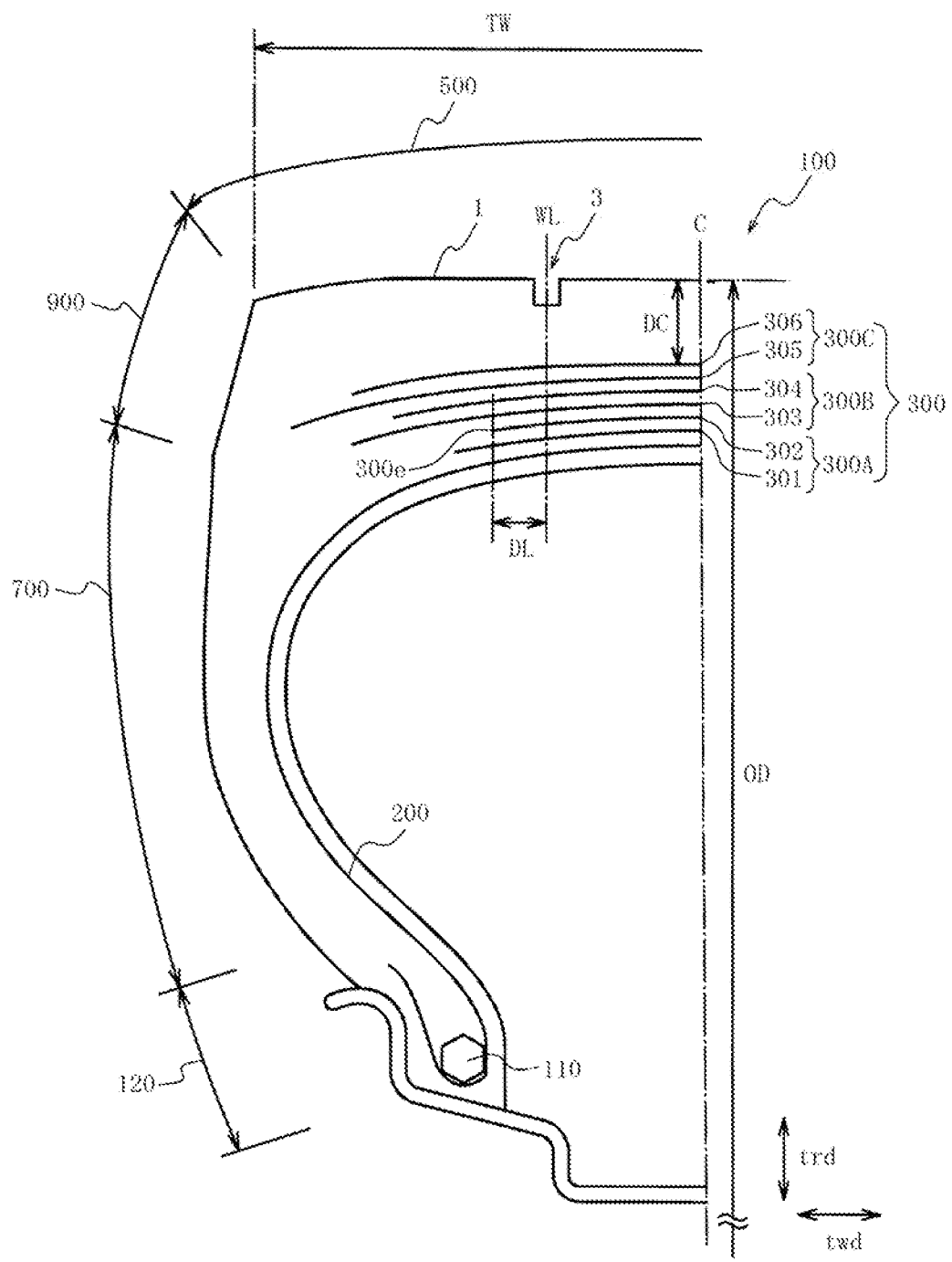
FIG. 3 is a sectional view in the tire width direction, illustrating an internal structure of the disclosed pneumatic tire according to an embodiment thereof.

FIG. 3 is a sectional view in the tire width direction, illustrating an internal structure of the disclosed pneumatic tire according to an embodiment thereof, in particular, a heavy load tire for a construction vehicle or the like. As illustrated in FIG. 3, the tire 100 is larger in rubber gauge (rubber thickness) of a tread portion 500, as compared with a pneumatic tire to be mounted onto a passenger car or the like. Note that the tire internal structure to be described in below is applicable to the respective tires each having the tread pattern illustrated with reference to FIG. 1.

Specifically, the tire 100 satisfies the relation of DC/OD≥0.015, where OD represents the tire outer diameter and DC represents the rubber gauge of the tread portion 500 at a position of the tire equatorial plane C.

The tire outer diameter OD (in the unit of mm) refers to the diameter of the tire 100 at a portion where the outer diameter of the tire 100 becomes maximum (such portion generally corresponds to the tread portion 500 near the tire equatorial plane C). The rubber gauge DC (in the unit of mm) refers to the thickness of the tread portion 500 at the position of the tire equatorial plane C. The rubber gauge DC is exclusive of the thickness of a belt 300. When the circumferential groove is formed at a position including the tire equatorial plane C, the rubber gauge DC refers to the rubber thickness of the tread portion 500 at a position adjacent to the circumferential groove.

As illustrated in FIG. 3, the tire 100 includes a pair of bead cores 110, a carcass 200, and the belt 300 including a plurality of belt layers. Note that FIG. 3 illustrates the tire 100 only in half width, whereas the other half width of the tire 100 not shown is similarly structured.

The bead core 110 is disposed in a bead portion 120. The bead core 110 is constituted of a bead wire (not shown).

The carcass 200 constitutes the skeleton of the tire 100. The carcass 200 is positioned from the tread portion 500 to come across a buttress portion 900 and a sidewall portion 700 to the bead portion 120.

The carcass 200 is disposed between the pair of bead cores 110 and has a toroidal shape. The carcass 200 in this embodiment is disposed around the bead core 110. The carcass 200 is in contact with the bead core 110. The carcass 200 is supported at both ends in the tire width direction twd by the pair of bead portions 120.

The carcass 200 has a carcass cord that extends in a predetermined direction when viewed in plan from the tread surface 1 side. In this embodiment, the carcass cord extends along the tire width direction twd. Steel wire may, for example, be used as the carcass cord.

The belt 300 is disposed in the tread portion 500. The belt 300 is positioned on the outside of the carcass 200 in the tire radial direction trd. The belt 300 extends in the tire circumferential direction. The belt 300 has a belt cord that extends as being inclined with respect to a predetermined direction as a direction in which the carcass cord extends. A steel cord, for example, may be used as the belt cord.

The belt 300 including the plurality of belt layers includes: a first belt layer 301; a second belt layer 302; a third belt layer 303; a fourth belt layer 304; a fifth belt layer 305; and a sixth belt layer 306.

The first belt layer 301 is positioned on the outside of the carcass 200 in the tire radial direction trd. The first belt layer 301 is positioned on the innermost side in the tire radial direction trd, among the plurality of belt layers forming the belt 300. The second belt layer 302 is positioned on the outside of the first belt layer 301 in the tire radial direction trd. The third belt layer 303 is positioned on the outside of the second belt layer 302 in the tire radial direction trd. The fourth belt layer 304 is positioned on the outside of the third belt layer 303 in the tire radial direction trd. The fifth belt layer 305 is positioned on the outside of the fourth belt layer 304 in the tire radial direction trd. The sixth belt layer 306 is positioned on the outside of the fifth belt layer 305 in the tire radial direction trd. The sixth belt layer 306 is positioned on the outermost side in the tire radial direction trd, among the plurality of belt layers forming the belt 300. The first belt layer 301, the second belt layer 302, the third belt layer 303, the fourth belt layer 304, the fifth belt layer 305, and the sixth belt layer 306 are arranged in the stated order from the inside to the outside.

According to this embodiment, in the tire width direction twd, the first belt layer 301 and the second belt layer 302 each have a width (the width being measured along the tire width direction twd; hereinafter the same) defined to be 25% or more and 70% or less of the tread width TW. In the tire width direction twd, the third belt layer 303 and the fourth belt layer 304 each have a width defined to be 55% or more and 90% or less of the tread width TW. In the tire width direction twd, the fifth belt layer 305 and the sixth belt layer 306 each have a width defined to be 60% or more and 110% or less of the tread width TW.

According to this embodiment, in the tire width direction twd, the width of the fifth belt layer 305 is larger than the width of the third belt layer 303, the width of the third belt layer 303 is equal to or larger than the width of the sixth belt layer 306, the width of the sixth belt layer 306 is larger than the width of the fourth belt layer 304, the width of the fourth belt layer 304 is larger than the width of the first belt layer 301, and the width of the first belt layer 301 is larger than the width of the second belt layer 302. In the tire width direction twd, among the plurality of belt layers forming the belt 300, the fifth belt layer 305 is largest in width and the second belt layer 302 is smallest in width. Accordingly, the belt 300 including the plurality of belt layers includes a shortest belt layer (i.e., the second belt layer 302) that is shortest in length in the tire width direction twd.

The second belt layer 302, which is the shortest belt layer, has a belt end 300e serving as an end in the tire width direction twd.

In this embodiment, when viewed in plan from the tread surface 1 side, the belt cords of the first belt layer 301 and the second belt layer 302 are inclined at an angle of 70° or more and 85° or less with respect to the carcass cord. The belt cords of the third belt layer 303 and the fourth belt layer 304 are inclined at an angle of 50° or more and 75° or less with respect to the carcass cord. The belt cords of the fifth belt layer 305 and the sixth belt layer 306 are inclined at an angle of 50° or more and 70° or less.

The belt 300 including the plurality of belt layers includes: an inner crossing belt group 300A; an intermediate crossing belt group 300B; and an outer crossing belt group 300C. The crossing belt groups 300A to 300C each refer to a group of a plurality of belt layers in which belt cords constituting the respective belt layers in each group cross one another between the belt layers adjacent to each other within the group (preferably across the tire equatorial plane), in plan view from the tread surface 1 side.

The inner crossing belt group 300A includes a pair of belt layers, and positioned on the outside of the carcass 200 in the tire radial direction trd. The inner crossing belt group 300A is constituted of the first belt layer 301 and the second belt layer 302. The intermediate crossing belt group 300B includes a pair of belt layers, and positioned on the outside of the inner crossing belt group 300A in the tire radial direction trd. The intermediate crossing belt group 300B is constituted of the third belt layer 303 and the fourth belt layer 304. The outer crossing belt group 300C includes a pair of belt layers, and positioned on the outside of the intermediate crossing belt group 300B in the tire radial direction trd. The outer crossing belt group 300C is constituted of the fifth belt layer 305 and the sixth belt layer 306.

In the tire width direction twd, the inner crossing belt group 300A has a width defined to be 25% or more and 80% or less of the tread width TW.

In the tire width direction twd, the intermediate crossing belt group 300B has a width defined to be 55% or more and 90% or less of the tread width TW. In the tire width direction twd, the outer crossing belt group 300C has a width defined to be 60% or more and 110% or less of the tread width TW.

When viewed in plan from the tread surface 1 side, the belt cord of the inner crossing belt group 300A is inclined at an angle of 70° or more and 85° or less with respect to the carcass cord. When viewed in plan from the tread surface 1 side, the belt cord of the intermediate crossing belt group 300B is inclined at an angle of 50° or more and 75° or less with respect to the carcass cord. When viewed in plan from the tread surface 1 side, the belt cord of the outer crossing belt group 300C is inclined at an angle of 50° or more and 70° or less with respect to the carcass cord.

When viewed in plan from the tread surface 1 side, the belt cord of the inner crossing belt group 300A is inclined with respect to the carcass cord at an angle larger than those of the rest of the belt cords. The belt cord of the intermediate crossing belt group 300B is inclined with respect to the carcass cord at an angle equal to or larger than that of the belt cord of the outer crossing belt group 300C.

The circumferential groove (intermediate circumferential groove) 3 is formed to have a length DL of 200 mm or less which is measured along the tire width direction twd from the belt end 300e to the tire width direction innermost position (i.e., bent part to the inside in the tire width direction) of a groove width center line WL passing through the widthwise center of the circumferential groove 3 when viewed in plan from the tread surface 1 side of the tire 100.

An operation of the air inflow part 11 is described in detail below, with reference to the drawings.

Figure 4A:
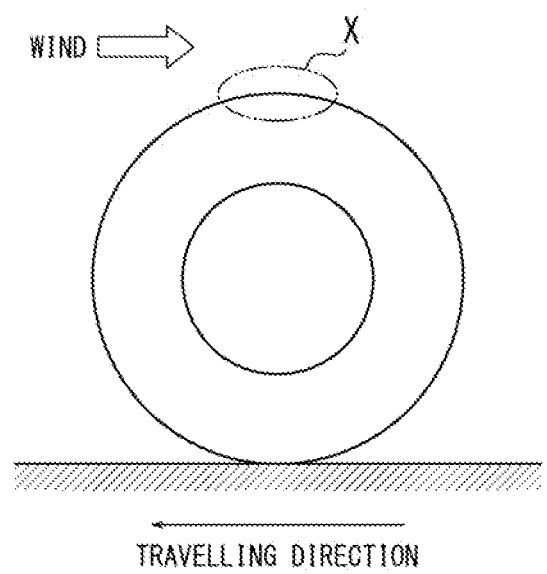
FIGS. 4A and 4B each are a view for illustrating an operation of the disclosed pneumatic tire.
Figure 4B:
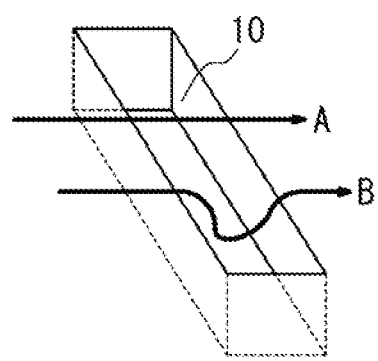

As illustrated in FIG. 4(a), when the tire rotates, wind flows around the tire in a direction opposite to the traveling direction of the tire. The wind may be taken into the grooves formed on the tread surface 1, to thereby dissipate heat from the tread portion, which lowers the temperature of the tread portion. When the grooves formed on the tread surface 1 are large in width, wind can be taken into the grooves but the land portion is reduced in rigidity, leading to deterioration of antiwear performance and steering stability. On the other hand, when the grooves formed on the tread surface 1 are small enough in width only not to affect rigidity of the land portion, the grooves cannot take wind thereinto. Specifically, referring to FIG. 4(b) which illustrates a portion denoted by X of FIG. 4(a), most of the wind is not taken into the narrow groove 10 formed on the tread surface 1 as indicated by the arrow A, and only a part of the wind is taken into the narrow groove 10 as indicated by the arrow B. However, even the wind indicated by the arrow B only passes through a shallow portion of the narrow groove 10 and is expelled from the narrow groove 10 without reaching the groove bottom of the narrow groove 10, which thus produces only a small effect of lowering the temperature of the tread portion.

Figure 4C:
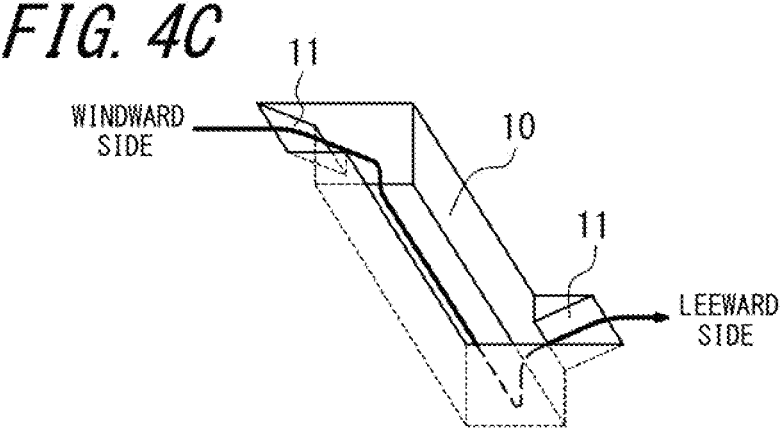
FIG. 4C is a view for illustrating an operation of a pneumatic tire according to a reference embodiment.

In light thereof, the air inflow part 11 is formed on the windward-side groove wall of the narrow groove 10 as illustrated in FIG. 4(*c*), to thereby take most of the wind into the narrow groove 10 and allow the wind thus taken into the narrow groove 10 to reach the groove bottom. Further, when the air inflow part 11 is also formed on the leeward-side groove wall, the wind is allowed to flow out from the air inflow part 11 thus formed. Note that even if the air inflow part 11 is not formed on the leeward-side groove wall, the wind having nowhere to go at the end of the narrow groove 10 can still flow out from the edge of the leeward-side groove wall. This configuration is capable of increasing the effect of lowering the temperature of the tread portion.

In particular, the disclosed effect becomes prominent when applied to a pneumatic tire for a construction vehicle because the tire has a portion on the vehicle side (opposite side to the tread side) denoted by X in the drawing which is exposed without being covered by the vehicle.

Figure 5A:
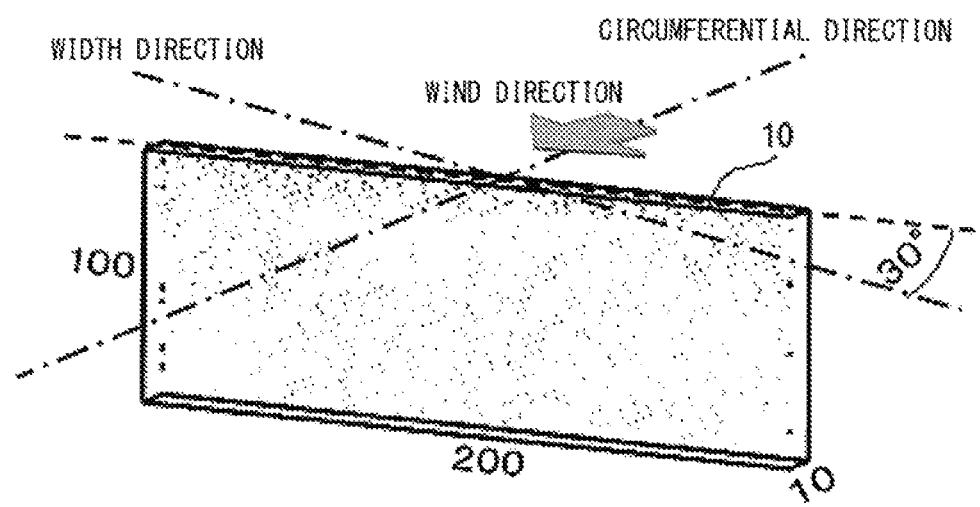
FIG. 5 each are an illustration of a wind speed vector within the narrow groove.
Figure 5B:
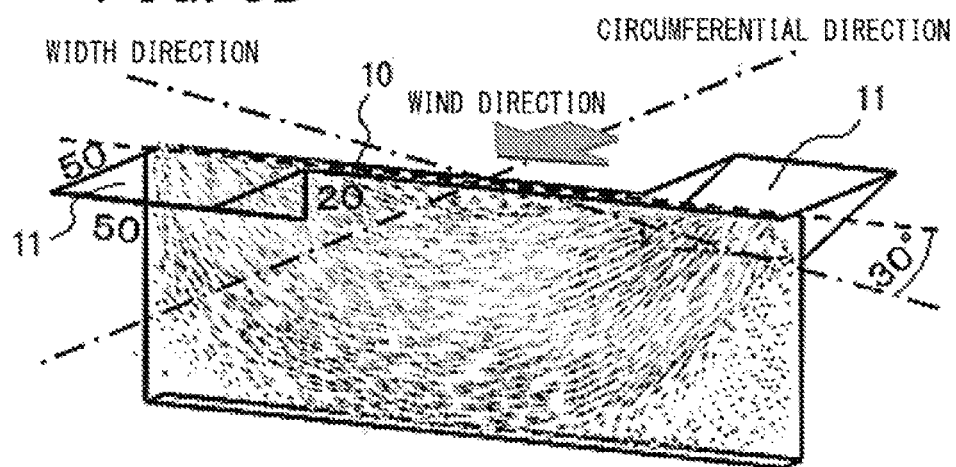
Figure 5C:

Referring to FIG. 5, description is given of numerical analysis on the wind speed vector within the narrow groove 10.

FIG. 5(*a*) illustrates the narrow groove 10 inclined at an angle of 30° with respect to the tire width direction, which is not provided with the air inflow part 11. FIG. 5(*b*) illustrates the narrow groove 10 provided with the air inflow parts 11 on the windward side and the leeward side. FIG. 5(*c*) shows the flow rate. The narrow groove 10 is in a size of 200 mm in length in the longitudinal direction, 10 mm in width, and 100 mm in depth, and inclined with respect to the tire width direction at an angle of 30°. The air inflow part 11 is in a size of 50 mm in length (length along the longitudinal direction of the narrow groove 10), 50 mm in width, and 20 mm in depth at the deepest part.

It can be appreciated from FIG. 5(*a*) that hardly any wind is taken into the narrow groove 10 when the air inflow part 11 is not provided.

On the other hand, it can also be appreciated from FIG. 5(*b*) that when the air inflow part 11 is provided, the wind speed vector becomes maximum in the vicinity of the air inflow part 11 on the windward-side groove wall and wind is taken into the narrow groove 10, and the wind speed vector again increases in the vicinity of the air inflow part 11 on the leeward-side groove wall.

The narrow groove 10 may preferably close during ground contact. Specifically, the narrow groove 10 may preferably have a width of about 10 mm to 20 mm. When the narrow groove 10 closes upon ground contact, the rib-shaped central land portion 7 becomes continuous. This enhances rigidity of the land portion to thereby improve antiwear performance.

Various modified examples of the air inflow part 11 are described in below, referring to FIGS. 6 to 9. In the drawings, the wind directions are indicated by the arrows.

When the narrow groove 10 is formed extending in a direction inclined with respect to the tire width direction, the air inflow part 11 may be formed, as illustrated in FIG. 6(*a*), on the groove wall at one end which receives wind first, of both ends of the narrow groove 10, or may be formed, as illustrated in FIG. 6(*b*), on the groove wall at the other end which receives wind last. Otherwise, as illustrated in FIG. 6(*c*), the air inflow part 11 may be formed in the central region of the narrow groove 10.

In the case where the air inflow parts 11 are respectively formed on the groove walls on both of the windward and leeward sides of the narrow groove 10, a center point A of one of the air inflow parts 11 along the longitudinal direction of the narrow groove 10, the air inflow part 11 being formed on one of the groove walls of the narrow groove 10, may preferably be spaced apart in the longitudinal direction of the narrow groove 10 from a center point B of the other one of the air inflow parts 11 along the longitudinal direction of the narrow groove 10, the air inflow part 11 being formed on the other one of the groove walls of the narrow groove 10, so that the inflow parts do not overlap one another with respect to the tire circumferential direction (direction in which wind is coming from).

Specifically, the air inflow parts 11 may preferably be formed on both sides of the narrow groove 10 as illustrated in FIGS. 7(*a*) and 7(*b*), and may preferably be formed in the central region as being displaced from each other as illustrated in FIGS. 7(*c*) and 7(*d*). Otherwise, as illustrated in FIG. 7(*e*), the air inflow parts 11 may be also formed side by side in the central region of the narrow groove 10; that is, the point A and the point B may be arranged without being spaced apart from each other in the longitudinal direction of the narrow groove 10.

Figures 8A, 8B, 8C, 8D:
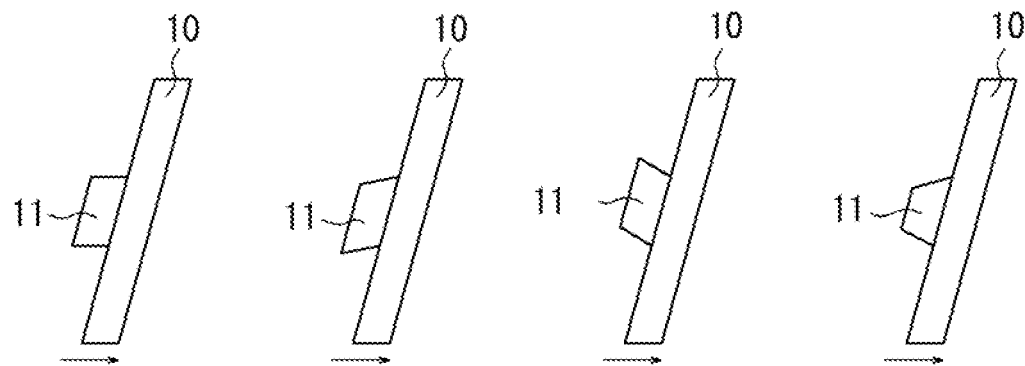
FIG. 8 each are an illustration of a modified example of the inflow part.
Figures 8E, 8F, 8G, 8H:
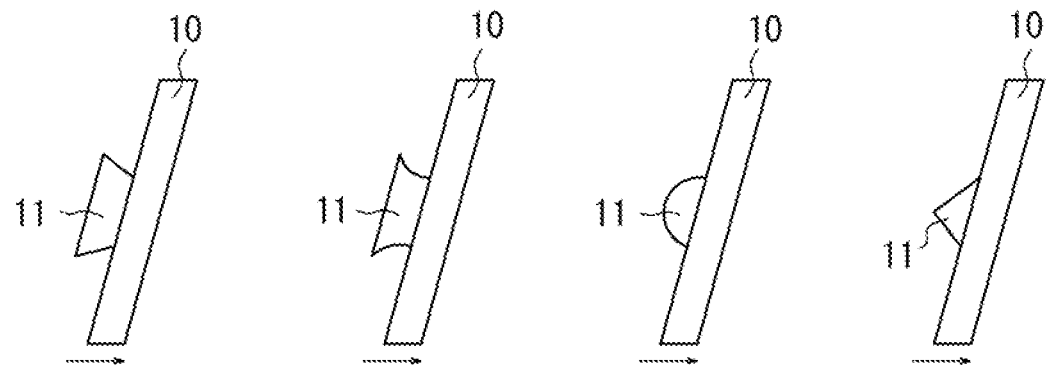

A planar shape of the air inflow part 11 viewed from the tread surface may be a parallelogram with a pair of opposite sides parallel to the wall of the narrow groove 10 and the other pair of opposite sides parallel to the tire circumferential direction as illustrated in FIG. 8(*a*), or may be parallelogram with a pair of opposite sides parallel to the wall of the narrow groove 10 and the other pair of opposite sides inclined with respect to the tire circumferential direction as illustrated in FIGS. 8(*b*) and 8(*c*). Further, as illustrated in FIG. 8(*d*), the planar shape of the air inflow part 11 may be a trapezoid with the lower base opening to the wall of the narrow groove 10 and the upper base being positioned on the farther side from the wall of the narrow groove 10; that is, the trapezoid gradually reduces in length in the tire width direction from the wall side of the narrow groove 10. Alternatively, as illustrated in FIG. 8(*e*), the planar shape of the air inflow part 10 may be a trapezoid with the upper base opening to the wall of the narrow groove 10 and the lower base positioned on the farther side from the wall of the narrow groove 10; that is, the trapezoid gradually increases in length in the tire width direction from the wall of the narrow groove 10. Still alternatively, as illustrated in FIG. 8(*f*), the planar shape of the air inflow part 11 may be a trapezoid shown in FIG. 8(*e*), with two sides other than the upper base and the lower base being curved. Otherwise, the planar shape of the air inflow part 11 may be semicircular as illustrated in FIG. 8(*g*), or may be triangular as illustrated in FIG. 8(*h*).

A side profile of the air inflow part 11 in section perpendicular to the longitudinal direction of the narrow groove may preferably be formed such that, as illustrated in FIGS. 9(*a*) to 9(*d*), the depth of the air inflow part 11 gradually increases from one side (point A in the drawing) farther from the wall of the narrow groove 10 to the other side (point B in the drawing) opening to the wall of the narrow groove 10, where the air inflow part 11 becomes deepest. However, the bottom plane of the air inflow part 11 may be flat as illustrated in FIG. 9(*a*), or may be curved as illustrated in FIGS. 9(*b*) to 9(*d*). Further, as illustrated in FIG. 9(*e*), the depth of the air inflow part 11 may increase stepwise from the point A to the point B. Alternatively, as illustrated in FIGS. 9(*f*) and 9(*g*), the air inflow part 11 may be have a depth that is constant between the point A and the point C and gradually increases from the point C to the point B, or as illustrated in FIG. 9(*h*), the air inflow part 11 may have a depth that gradually increases from the point A to the point C and is constant from the point C to the point B. Otherwise, as illustrated in FIG. 9(i), the air inflow part 11 may have a depth that is constant from the point A to the point B.

EXAMPLES

Prophetic examples of the disclosed pneumatic tire are described in below.

As illustrated in FIG. 1(a), in an ultra-large ORR (off-the-Road Radial) tire having the tread pattern of FIG. 1(a), the narrow grooves 10 and the air inflow parts 11 are formed in various depths, so as to investigate the difference in heat dissipation effect. Table 1 shows the maximum depth dimensions D1 and D2 of the narrow groove 10 and the air inflow part 11 of each of the tires according to Examples 1 to 4, and Comparative Examples 1, 2. Here, the longitudinal direction of the narrow groove 10 is inclined at an angle of 90° with respect to the tire circumferential direction, the narrow groove 10 has a length of L1 of 1000 mm in the longitudinal direction thereof, the narrow groove 10 has a groove width W1 of 20 mm, the air inflow part 11 has a length L2 of 250 mm, and the air inflow part 11 has a width W2 of 50 mm

TABLE 1

|  | Ex. 1 | Ex. 2 | Ex. 3 | Ex. 4 | Comp. Ex. 1 | Comp. Ex. 2 |
|---|---|---|---|---|---|---|
| Depth of Narrow Groove D1 [mm] | 20 | 100 | 200 | 300 | 360 | 400 |
| Depth of Air Inflow Part D2 [mm] | 20 | 20 | 20 | 20 | 20 | 20 |
| D1/D2 | 1 | 5 | 10 | 15 | 18 | 20 |
| Average Heat Transfer Coefficient [W/m^2 · K] | 39.2 | 41.6 | 29.7 | 21.1 | 8.2 | 8.0 |

Figure 10:
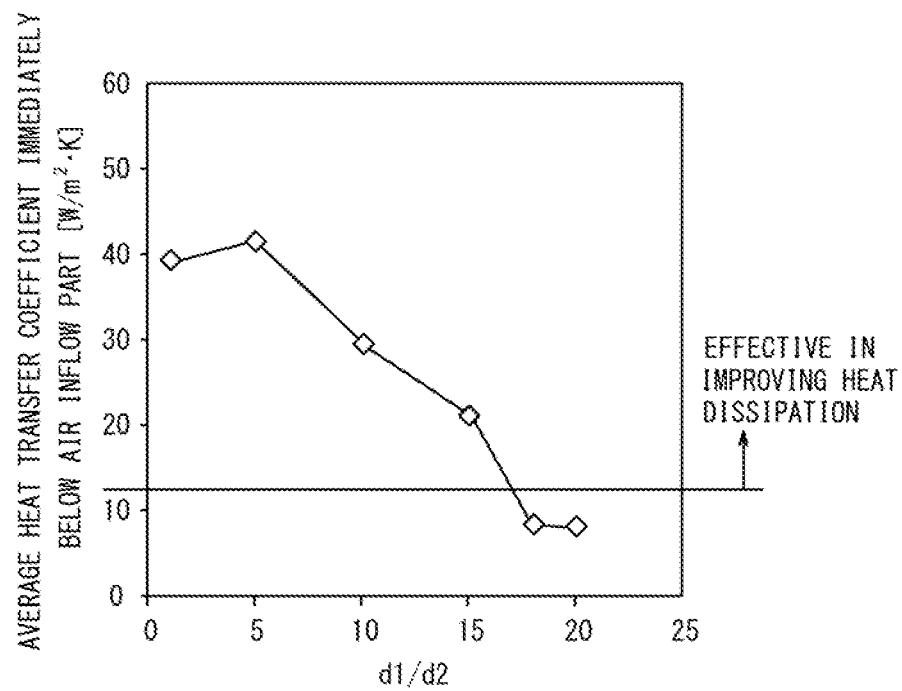
FIG. 10 is a graph showing the results of Examples of the disclosed pneumatic tire.

These tires are used to measure the heat transfer coefficient of the groove bottom, with a main airflow at the velocity of 20 km/h, using a film heater. The measurement is conducted at a groove bottom point immediately below the air inflow part 11 of each of the narrow grooves 10. Results of the measurement are shown in Table 1 and the graph of FIG. 10. It can be appreciated from Table 1 and FIG. 10 that when the maximum depth D1 of the narrow groove 10 and the maximum depth D2 of the air inflow part 11 satisfy: $1 \leq D1/D2 \leq 15$, the heat dissipation effect is significantly improved. Further, no partial wear or fracture can be observed in tires during the test or after the test, and thus the tires have sufficient rigidity of the land portion.

INDUSTRIAL APPLICABILITY

As described above, it becomes possible to provide a pneumatic tire improved in heat dissipation effect while ensuring the rigidity of the land portion.

REFERENCE SIGNS LIST 1 tread surface
2 central circumferential groove
3 intermediate circumferential groove
4 lateral circumferential groove
5 intermediate widthwise groove
6 lateral widthwise groove
7 rib-shaped central land portion
8 block-shaped intermediate land portion
9 block-shaped lateral land portion
10 narrow groove
10c groove wall of the narrow groove
11 air inflow part
11a groove wall opening edge of the air inflow part

The invention claimed is:

1. A pneumatic tire comprising
a central circumferential groove extending along a tire circumferential direction on a tire equatorial plane,
a pair of intermediate circumferential grooves extending along the tire circumferential direction on each side of the central circumferential groove,
a pair of rib-shaped central land portions defined on each side of the tire equatorial plane by the central circumferential groove and the intermediate circumferential grooves, and
a first narrow groove formed on a tread surface of one of the rib-shaped central land-portions and a second narrow groove formed on a tread surface of the other of the rib-shaped central land portions, the first and second narrow grooves extending in a direction inclined with respect to the tire circumferential direction and having a groove width smaller than a groove depth,
the first narrow groove terminating at one end within the one of the rib-shaped central land portions and opening at the other end to the central circumferential groove,
the second narrow groove terminating at one end within the other of the rib-shaped central land portions and opening at the other end to the central circumferential groove,
the first narrow groove having a first air inflow part that extends from one side of the groove walls facing each other and terminates within the one of the rib-shaped central land portions in the tire circumferential direction, the first air inflow part opening to the tread,
the second narrow groove having a pair of groove walls facing each other in the tire circumferential direction,
the second narrow groove having a second air inflow part that extends from the opposite side to the first air inflow part in the circumferential direction of the pair of groove walls facing each other and terminates within the other of the rib-shaped central land portions in the tire circumferential direction, the second air inflow part opening to the tread,
wherein the first narrow groove has a maximum depth D1 and the first air inflow part has a maximum depth D2, D1 and D2 satisfying:
$1 \leq D1/D2 \leq 15$;
wherein the second narrow groove has a maximum depth D1' and the second air inflow part has a maximum depth D2', D1' and D2' satisfying:
$1 - D1'/D2' \leq 15$;
wherein the first air inflow part is formed at the one end of the first narrow groove and the second air inflow part is formed at the one end of the second narrow groove;
wherein groove widths of the first and second narrow grooves are in a range of 10 mm to 20 mm;
wherein distances in the tire width direction from the respective adjacent intermediate circumferential grooves to the first and second narrow grooves are in a range of 5% to 40% with respect to a width in the tire width direction of the rib-shaped central land portions;
wherein the first and second narrow grooves are inclined at an angle of 45° or more and 90° or less with respect to the tire circumferential direction; and
wherein the first air inflow part has a length along the longitudinal direction of the first narrow groove of 5 mm or more and ½ or less of a length of the first narrow groove along the longitudinal direction and the second air inflow part has a length along the longitudinal direction of the second narrow groove of 5 mm or more and ½ or less of a length of the second narrow groove along the longitudinal direction, wherein one end of the first air inflow part farther from the one side of the groove walls of the first narrow groove and the other end of the first air inflow part opening to the one side of the groove walls at least partially overlap in the tire circumferential direction, wherein one end of the second air inflow part farther from the one side of the groove walls of the second narrow groove and the other end of the second air inflow part opening to the one side of the groove walls at least partially overlap in the tire circumferential direction, wherein the length of the first air inflow part along the longitudinal direction of the first narrow groove is equal to or greater than the width of the first air inflow part along the tire circumferential direction, and wherein the length of the second air inflow part along the longitudinal direction of the second narrow groove is equal to or greater than the width of the second air inflow part along the tire circumferential direction.

2. The pneumatic tire according to claim 1, wherein the first air inflow part has a width that reaches its maximum at the groove wall opening edge opening to the groove wall of the first narrow groove and the second air inflow part has a width that reaches its maximum at the groove wall opening edge opening to the groove wall of the second narrow groove.

3. The pneumatic tire according to claim 2, wherein the first air inflow part has a depth that gradually increases toward the groove wall opening edge and the second air inflow part has a depth that gradually increases toward the groove wall opening edge.

4. The pneumatic tire according to claim 1, wherein the pneumatic tire is a construction vehicle tire.

5. The pneumatic tire according to claim 1, wherein the pneumatic tire satisfies a relation of DC/OD≥0.015, where OD represents a tire outer diameter and DC represents a rubber gauge of a tread portion at a position of a tire equatorial plane.

6. The pneumatic tire according to claim 1, wherein D1 and D2 satisfy:
5≤D1/D2≤10.

7. A pneumatic tire comprising
a central circumferential groove extending along a tire circumferential direction on a tire equatorial plane,
a pair of intermediate circumferential grooves extending along the tire circumferential direction on each side of the central circumferential groove,
a pair of rib-shaped central land portions defined on each side of the tire equatorial plane by the central circumferential groove and the intermediate circumferential grooves, and
a first narrow groove formed on a tread surface of one of the rib-shaped central land-portions and a second narrow groove formed on a tread surface of the other of the rib-shaped central land portions, the first and second narrow grooves extending in a direction inclined with respect to the tire circumferential direction and having a groove width smaller than a groove depth,
the first narrow groove terminating at one end within the one of the rib-shaped central land portions and opening at the other end to the central circumferential groove,
the second narrow groove terminating at one end within the other of the rib-shaped central land portions and opening at the other end to the central circumferential groove,
the first narrow groove having a first air inflow part that extends from one side of the groove walls facing each other and terminates within the one of the rib-shaped central land portions in the tire circumferential direction, the first air inflow part opening to the tread,
the second narrow groove having a pair of groove walls facing each other in the tire circumferential direction,
the second narrow groove having a second air inflow part that extends from the opposite side to the first air inflow part in the circumferential direction of the pair of groove walls facing each other and terminates within the other of the rib-shaped central land portions in the tire circumferential direction, the second air inflow part opening to the tread,
wherein the first narrow groove has a maximum depth D1 and the first air inflow part has a maximum depth D2, D1 and D2 satisfying:
1≤D1/D2≤15;
wherein the second narrow groove has a maximum depth D1' and the second air inflow part has a maximum depth D2', D1' and D2' satisfying:
1≤D1'/D2'≤15;
wherein the first air inflow part is formed at the one end of the first narrow groove and the second air inflow part is formed at the one end of the second narrow groove;
wherein the pneumatic tire satisfies a relation of DC/OD≥0.015, where OD represents a tire outer diameter and DC represents a rubber gauge of a tread portion at a position of a tire equatorial plane;
wherein distances in the tire width direction from the respective adjacent intermediate circumferential grooves to the first and second narrow grooves are in a range of 5% to 40% with respect to a width in the tire width direction of the rib-shaped central land portions;
wherein the first and second narrow grooves are inclined at an angle of 45° or more and 90° or less with respect to the tire circumferential direction; and
wherein the first air inflow part has a length along the longitudinal direction of the first narrow groove of 5 mm or more and ½ or less of a length of the first narrow groove along the longitudinal direction and the second air inflow part has a length along the longitudinal direction of the second narrow groove of 5 mm or more and ½ or less of a length of the second narrow groove along the longitudinal direction,
wherein one end of the first air inflow part farther from the one side of the groove walls of the first narrow groove and the other end of the first air inflow part opening to the one side of the groove walls at least partially overlap in the tire circumferential direction,
wherein one end of the second air inflow part farther from the one side of the groove walls of the second narrow groove and the other end of the second air inflow part opening to the one side of the groove walls at least partially overlap in the tire circumferential direction,
wherein the length of the first air inflow part along the longitudinal direction of the first narrow groove is equal to or greater than the width of the first air inflow part along the tire circumferential direction, and
wherein the length of the second air inflow part along the longitudinal direction of the second narrow groove is equal to or greater than the width of the second air inflow part along the tire circumferential direction.

8. The pneumatic tire according to claim 7, wherein the first air inflow part has a width that reaches its maximum at the groove wall opening edge opening to the groove wall of the first narrow groove and the second air inflow part has a width that reaches its maximum at the groove wall opening edge opening to the groove wall of the second narrow groove.

9. The pneumatic tire according to claim 8, wherein the first air inflow part has a depth that gradually increases toward the groove wall opening edge and the second air inflow part has a depth that gradually increases toward the groove wall opening edge.

10. The pneumatic tire according to claim 7, wherein the pneumatic tire is a construction vehicle tire.

11. The pneumatic tire according to claim 7, wherein D1 and D2 satisfy:

$5 \leq D1/D2 \leq 10$.

* * * * *